US012202180B2

(12) United States Patent
Wang et al.

(10) Patent No.: US 12,202,180 B2
(45) Date of Patent: Jan. 21, 2025

(54) PROCESS FOR PREPARING A CAP OR CLOSURE

(71) Applicant: BOREALIS AG, Vienna (AT)

(72) Inventors: Jingbo Wang, Linz (AT); Markus Gahleitner, Linz (AT); Elisabeth Potter, Linz (AT); Luc Monnissen, Arsimont (BE); Meta Cigon, Vienna (AT); Daniela Mileva, Linz (AT)

(73) Assignee: Borealis AG, Vienna (AT)

( * ) Notice: Subject to any disclaimer, the term of this patent is extended or adjusted under 35 U.S.C. 154(b) by 526 days.

(21) Appl. No.: 17/607,059

(22) PCT Filed: Apr. 28, 2020

(86) PCT No.: PCT/EP2020/061795
§ 371 (c)(1),
(2) Date: Oct. 28, 2021

(87) PCT Pub. No.: WO2020/221765
PCT Pub. Date: Nov. 5, 2020

(65) Prior Publication Data
US 2022/0227030 A1 Jul. 21, 2022

(30) Foreign Application Priority Data

Apr. 29, 2019 (EP) ..................................... 19171610

(51) Int. Cl.
B29C 45/72 (2006.01)
B29C 45/00 (2006.01)
(Continued)

(52) U.S. Cl.
CPC ...... B29C 45/0001 (2013.01); B29C 45/7207 (2013.01); B29C 48/00 (2019.02);
(Continued)

(58) Field of Classification Search
CPC ............. C08L 23/142; C08L 2205/025; C08L 2205/24; C08L 2308/00; C08L 2314/02;
(Continued)

(56) References Cited

FOREIGN PATENT DOCUMENTS

CN 102532711 A 7/2012
CN 104797652 A 7/2015
(Continued)

OTHER PUBLICATIONS

Lin, "Research on Influence of Nucleating Agent on Injection Molding Cycle of Polypropylene," Home Appliance, Sep. 2017, p. 42-43.
(Continued)

Primary Examiner — Monica A Huson
(74) Attorney, Agent, or Firm — Meunier Carlin & Curfman LLC

(57) ABSTRACT

A process for producing a cap or closure comprising obtaining a polypropylene composition by sequential polymerization comprising the steps: A) polymerizing in a first reactor, preferably a slurry reactor, in the presence of a Ziegler-Natta catalyst monomers comprising propylene and optionally one or more comonomers selected from ethylene and C4-C10 alpha-olefins, to obtain a first propylene polymer fraction having a comonomer content in the range of 0.0 to 1.8 wt %, and a MFR2 in the range of from 12.0 to 40.0 g/10 min, as measured according to ISO 1133 at 230° C. under a load of 2.16 kg; B) polymerizing in a second reactor, preferably a first gas-phase reactor, monomers comprising propylene and one or more comonomers selected from ethylene and C4-C10 alpha-olefins, in the presence of the first propylene polymer fraction, to obtain a second propylene polymer fraction, wherein the polypropylene composition comprising said first and second propylene polymer fractions has an MFR2 in the range of from 12.0 to 60.0 g/10 min, as
(Continued)

measured according to ISO 1133 at 230° C. under a load of 2.16 kg, has a comonomer content in the range of from 2.2 to 5.0 wt % and wherein the ratio of the comonomer content of component A) to the comonomer content of the polypropylene composition is 0.35 or less, C) melting, extruding and moulding the polypropylene composition in the presence of at least one nucleating agent to prepare a cap or closure; and D) exposing the cap or closure obtained in step (C) to a cooling rate of 50 K/s or more.

21 Claims, 1 Drawing Sheet

(51) Int. Cl.
| | | |
|---|---|---|
| *B29C 48/00* | (2019.01) | |
| *C08F 110/06* | (2006.01) | |
| *B29C 45/46* | (2006.01) | |
| *B29K 23/00* | (2006.01) | |
| *B29L 31/56* | (2006.01) | |

(52) U.S. Cl.
CPC ............ *C08F 110/06* (2013.01); *B29C 45/46* (2013.01); *B29K 2023/12* (2013.01); *B29L 2031/56* (2013.01)

(58) Field of Classification Search
CPC .. C08L 2205/06; C08L 2205/03; B29C 48/00; B29C 45/7207; B29C 45/0001; B29C 45/46; C08F 110/06; C08F 210/06; C08F 4/651; C08F 4/6546; C08F 4/6541; C08F 4/6465; C08F 2/001; C08F 210/16; C08F 2500/12; C08F 2500/27; C08F 2500/35; C08F 2500/33; C08K 5/0083; B29L 2031/56; B29K 2023/12
See application file for complete search history.

(56) References Cited

FOREIGN PATENT DOCUMENTS

| EA | 014272 B1 | 10/2010 |
|---|---|---|
| EP | 0339804 | 7/1997 |
| EP | 0860457 | 4/2003 |
| EP | 0887379 | 12/2004 |
| EP | 2625223 | 8/2013 |
| EP | 3006472 | 4/2016 |
| EP | 2686382 | 8/2016 |
| EP | 2898017 | 3/2017 |
| EP | 2610272 | 5/2017 |
| EP | 2610271 | 3/2019 |
| RU | 2637911 C2 | 12/2017 |
| WO | 1999024478 | 5/1999 |
| WO | 1999024479 A1 | 5/1999 |
| WO | 2004000899 | 12/2003 |
| WO | 2004111095 | 12/2004 |
| WO | 2007057142 A1 | 5/2007 |
| WO | 2007093376 A1 | 8/2007 |
| WO | 2009021686 | 2/2009 |
| WO | 2011071718 A2 | 6/2011 |
| WO | 2012007430 | 1/2012 |
| WO | 2012126759 | 9/2012 |
| WO | 2014154610 | 10/2014 |
| WO | 2014187687 | 11/2014 |
| WO | 2014199271 A1 | 12/2014 |
| WO | 2016055361 | 4/2016 |
| WO | 2016116606 | 7/2016 |
| WO | 2016135107 | 9/2016 |
| WO | 2016135108 | 9/2016 |
| WO | 2019002345 | 1/2019 |
| WO | 2019002346 | 1/2019 |
| WO | 2019048529 A1 | 3/2019 |
| WO | 2019115510 | 6/2019 |

OTHER PUBLICATIONS

International Search Report and Written Opinion in PCT/EP2020/061795. Mailed Jul. 20, 2020. 14 pages.
Busico, Vincenzo, et al. "Alk-1-ene Polymerization in the Presence of a Monocyclopentadienyl Zirconium (iv) Acetamidinate Catalyst: Microstructural and Mechanistic Insights." Macromolecular rapid communications 28.10 (2007): 1128-1134.
Chemical Abstracts, Columbus, Ohio, US; abstract No. 135861-56-2.
Cheng, H. N. "Carbon-13 NMR analysis of ethylene-propylene rubbers." Macromolecules 17.10 (1984): 1950-1955.
Del Hierro, et al. "Soluble Fraction Analysis in polypropylene", The Column Advanstar Publications, Feb. 2014 (Feb. 1, 2014), pp. 18-23.
Iervolino, E., et al. "Temperature calibration and electrical characterization of the differential scanning calorimeter chip UFS1 for the Mettler-Toledo Flash DSC 1." Thermochimica acta 522.1-2 (2011): 53-59.
Mathot, Vincent, et al. "The Flash DSC 1, a power compensation twin-type, chip-based fast scanning calorimeter (FSC): First findings on polymers." Thermochimica Acta 522.1-2 (2011): 36-45.
Mileva, Daniela, Davide Tranchida, and Markus Gahleitner. "Designing polymer crystallinity: An industrial perspective." Polymer Crystallization 1.2 (2018): e10009.
Rhoades, Alicyn Marie, et al. "Effect of cooling rate on crystal polymorphism in beta-nucleated isotactic polypropylene as revealed by a combined WAXS/FSC analysis." Polymer 90 (2016): 67-75.
Singh, Gurmeet, Ajay V. Kothari, and Virendra K. Gupta. "Triad sequence determination of ethylene-propylene copolymers-application of quantitative 13C NMR." Polymer Testing 28.5 (2009): 475-479.
Van Drongelen, Martin, et al. "Microfocus wide-angle X-ray scattering of polymers crystallized in a fast scanning chip calorimeter." Thermochimica acta 563 (2013): 33-37.
Wang, Wen-Jun, and Shiping Zhu. "Structural analysis of ethylene/propylene copolymers synthesized with a constrained geometry catalyst." Macromolecules 33.4 (2000): 1157-1162.
Zhou, Zhe, et al. "A new decoupling method for accurate quantification of polyethylene copolymer composition and triad sequence distribution with 13C NMR." Journal of Magnetic Resonance 187.2 (2007): 225-233.

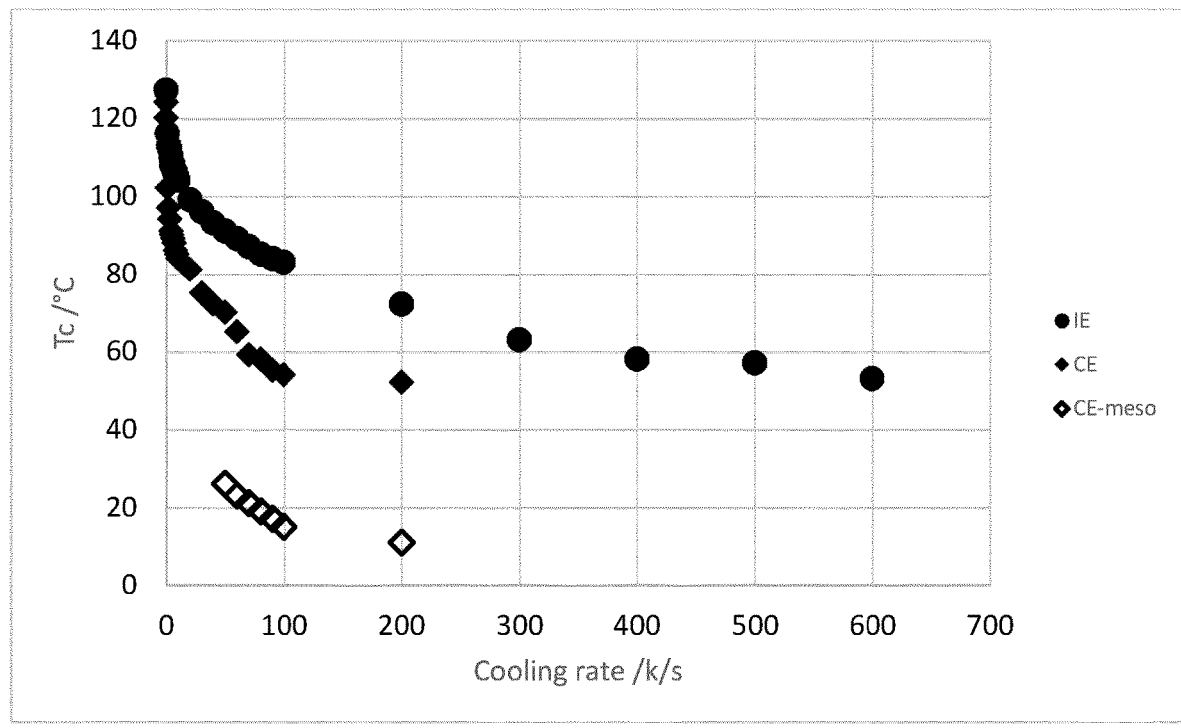
Figure 1. FSC of IE and CE
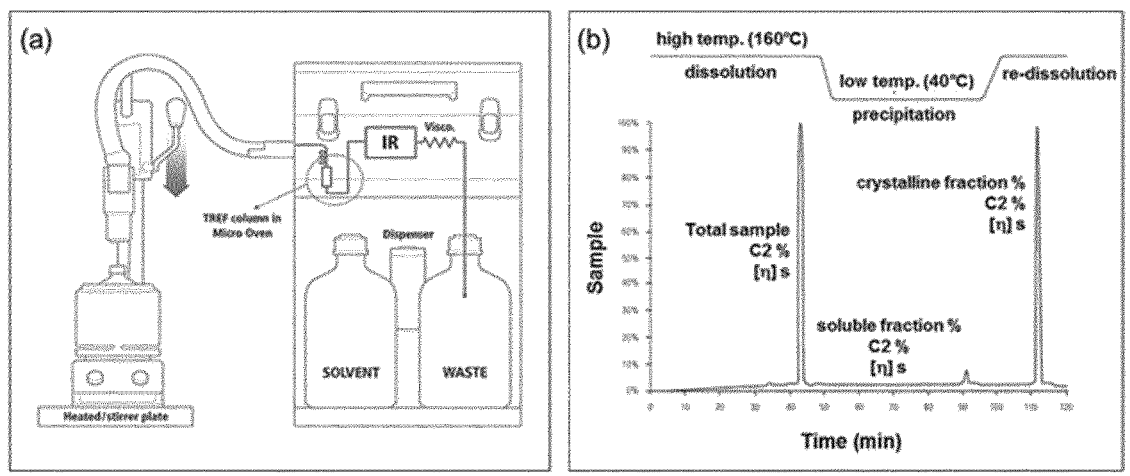
Figure 2

PROCESS FOR PREPARING A CAP OR CLOSURE

CROSS-REFERENCE TO RELATED APPLICATIONS

The present disclosure is the national phase under 35 U.S.C 371 of PCT/EP2020/061795 filed on Apr. 28, 2020, which claims priority to European Patent Application No. 19171610.9, filed with the European Patent Office on Apr. 29, 2019, both of which are incorporated herein by reference in their entireties.

The present invention relates to a process for producing a cap or closure. The process first requires the preparation of a polypropylene composition by sequential polymerization. More specifically, the invention first relates to a process for producing a polypropylene composition comprising propylene and one or more comonomers selected from ethylene and $C_4$-$C_{10}$ alpha-olefins and to the conversion of the formed polypropylene composition into a cap or closure. The invention further relates to caps or closures made by the process of the invention.

BACKGROUND

Propylene homopolymers and copolymers are suitable for many applications such as packaging, textile, automotive and pipe. An important area of application of propylene homopolymers and copolymers is the packaging industry, particularly in cap and closure manufacture.

In the field of caps and closures, it is of great importance to have a rapid cycle time. Cycle time is the time taken to make each cap in the moulding apparatus. A short cycle time is preferred for production efficiency and energy consumption reduction.

It has been found that by properly combining the loop and GPR fractions in a sequential polymerisation process, one can make a composition with faster crystallization over a wide range of cooling rates, especially at higher cooling rates (e.g. 100 K/s or above). Faster crystallization can be used as tool to tune the solidification process during injection moulding process, achieving lower cycle time. Faster crystallization allows the use of faster cooling rates and hence faster cycle times.

WO 2019/002345 and WO 2019/002346 relate to a process for producing a polypropylene composition by sequential polymerization, the polypropylene composition having an improved combination of high flowability, high stiffness and impact, and high level of optical properties. The polymers described therein have the same design concept as those of use in the present invention however there is no appreciation in these documents that the crystallisation behaviour of these grades is remarkable. There is no appreciation therefore that the polymers described therein can be used with high cooling rates in cap and closure manufacture.

WO2009/021686 describes a cap or closure comprising a polypropylene composition comprising a random propylene ethylene copolymer with defined ethylene content in combination with certain additives.

WO2016/116606 describes a polypropylene composition with good mechanical and optical properties, good organoleptics and low volatiles. The composition is a two component composition with bimodal comonomer distribution.

EP3006472 describes a process for the preparation of a nucleated polypropylene and subjecting that polypropylene to high cooling rates. Many of the polymers exemplified therein are unimodal or lack the ratio of comonomer content required in the present case.

The present invention is based on the finding that by properly combining the loop and GPR fractions, one can make a composition with faster crystallization over a wide range of cooling rates, especially at higher cooling rates (e.g. 100 K/s or above). A faster crystallization can be used as tool to tune the solidification process during an injection moulding process to thus achieve lower cycle time. The polypropylene polymers of the invention are therefore of particular interest in the manufacture of caps and closures where a rapid cycle time is critical.

It is also required that the comonomer present is primarily present in the GPR fraction. This increases the impact properties of the material but might be expected to reduce the crystallisation speed. Remarkable, we are able to operate with a large loop gas phase comonomer split without reducing the crystallisation speed. The invention therefore maximises impact and crystallisation speed.

SUMMARY OF INVENTION

Thus, viewed from one aspect the invention provides a process for producing a cap or closure comprising obtaining a polypropylene composition by sequential polymerization comprising the steps:

A) polymerizing in a first reactor, preferably a slurry reactor, in the presence of a Ziegler-Natta catalyst, monomers comprising propylene and optionally one or more comonomers selected from ethylene and C4-C10 alpha-olefins, to obtain a first propylene polymer fraction having a comonomer content in the range of 0.0 to 1.8 wt %, and a MFR2 in the range of from 12.0 to 40.0 g/10 min, as measured according to ISO 1133 at 230° C. under a load of 2.16 kg;

B) polymerizing in a second reactor, preferably a first gas-phase reactor, monomers comprising propylene and one or more comonomers selected from ethylene and C4-C10 alpha-olefins, in the presence of the first propylene polymer fraction, to obtain a second propylene polymer fraction, wherein the polypropylene composition comprising said first and second propylene polymer fractions has an MFR2 in the range of from 12.0 to 60.0 g/10 min, as measured according to ISO 1133 at 230° C. under a load of 2.16 kg, has a comonomer content in the range of from 2.2 to 5.0 wt % and wherein the wt ratio of the comonomer content of component A) to the comonomer content of the polypropylene composition is 0.35 or less, C) melting, extruding and moulding the polypropylene composition in the presence of at least one nucleating agent to prepare a cap or closure; and D) exposing the cap or closure obtained in step (C) to a cooling rate of 50 K/s or more.

Viewed from another aspect the invention provides a process for producing a cap or closure comprising obtaining a polypropylene composition by sequential polymerization comprising:

A) polymerizing in a first reactor, preferably a slurry reactor, in the presence of a Ziegler-Natta catalyst, monomers comprising propylene and optionally one or more comonomers selected from ethylene and C4-C10 alpha olefins, to obtain a first propylene polymer fraction having a comonomer content in the range of 0.0 to 1.8 wt %, and a MFR2 in the range of from 12.0 to 40.0 g/10 min, as measured according to ISO 1133 at 230° C. under a load of 2.16 kg;

(B) polymerizing in a second reactor, preferably a first gas-phase reactor, monomers comprising propylene and one or more comonomers selected from ethylene and optionally C4-C10 alpha olefins, in the presence of the first propylene polymer fraction, to obtain a second propylene polymer fraction, (C) polymerizing in a third reactor, preferably a second gas-phase reactor, monomers comprising propylene and one or more comonomers selected from ethylene and optionally C4-C10 alpha olefins, in the presence of the second propylene polymer fraction to obtain a third propylene polymer fraction;

wherein the polypropylene composition comprising said first, second and third propylene polymer fractions has an MFR2 in the range of from 12.0 to 60.0 g/10 min, as measured according to ISO 1133 at 230° C. under a load of 2.16 kg, has a comonomer content in the range of from 2.2 to 5.0 wt % and wherein the wt ratio of the comonomer content of component A) to the comonomer content of the polypropylene composition is 0.35 or less, D) melting, extruding and moulding the polypropylene composition in the presence of at least one nucleating agent to prepare a cap or closure; and E) exposing the cap or closure obtained in step (D) to a cooling rate of 50 K/s or more.

Viewed from another aspect the invention provides a cap or closure comprising polypropylene composition and at least one nucleating agent said polypropylene composition having a first homo or copolymer fraction, a second copolymer fraction and optionally a third copolymer fraction, said polypropylene composition having an ethylene content of 2.2 to 5.0 wt % and, wherein said polypropylene composition has
  a crystallisation temperature (Tc) of at least 90° C. when subjected to a cooling rate of 10 K/s.;
  a crystallisation temperature (Tc) of at least 55° C. when subjected to a cooling rate of 100 K/s.; and
  a crystallisation temperature (Tc) of at least 40° C. when subjected to a cooling rate of 300 K/s.

Preferably a cap or closure as defined herein has a MFR2 in the range of from 12.0 to 60.0 g/10 min, as measured according to ISO 1133 at 230° C. under a load of 2.16 kg, and a ratio of the comonomer content of the first homo or copolymer fraction to the comonomer content of the polypropylene composition is 0.35 or less. More preferably, a cap or closure as defined herein comprises a polypropylene composition having a first homo or copolymer fraction, a second copolymer fraction and a third copolymer fraction.

Viewed from another aspect the invention provides a process for producing a cap or closure comprising obtaining a polypropylene composition comprising a nucleating agent and a polypropylene composition having a first homo or copolymer fraction, a second copolymer fraction and optionally a third copolymer fraction, said polypropylene composition having an ethylene content of 2.2 to 5.0 wt % and, wherein said polypropylene composition has
  a crystallisation temperature (Tc) of at least 90° C. when subjected to a cooling rate of 10 K/s.;
  a crystallisation temperature (Tc) of at least 55° C. when subjected to a cooling rate of 100 K/s.; and
  a crystallisation temperature (Tc) of at least 40° C. when subjected to a cooling rate of 300 K/s;

melting, extruding and moulding the polypropylene composition in the presence of the at least one nucleating agent to prepare a cap or closure; and
exposing the cap or closure obtained to a cooling rate of 50 K/s or more.

Viewed from another aspect the invention provides the use of a polypropylene composition and at least one nucleating agent said polypropylene composition having a first homo or copolymer fraction, a second copolymer fraction and optionally a third copolymer fraction, said polypropylene composition having an ethylene content of 2.2 to 5.0 wt % and, wherein said polypropylene composition has
  a crystallisation temperature (Tc) of at least 90° C. when subjected to a cooling rate of 10 K/s.;
  a crystallisation temperature (Tc) of at least 55° C. when subjected to a cooling rate of 100 K/s.; and
  a crystallisation temperature (Tc) of at least 40° C. when subjected to a cooling rate of 300 K/s;
  to reduce the cycle time in cap or closure production.

DETAILED DESCRIPTION OF THE INVENTION

This invention concerns a process for the preparation of a cap or closure. The process requires the preparation of the required polypropylene composition followed by a step of converting the composition into the cap or closure.

First Embodiment

In a first embodiment, the polypropylene composition used to manufacture the caps or closures of the invention can be made in at least two main polymerisation stages, e.g. two steps only. In a second embodiment, the polypropylene composition used to manufacture the caps or closures of the invention can be made in at least three main polymerisation stages, e.g. three steps only.

In the first embodiment, the first and second propylene polymer fractions, according to the present invention, are produced in a sequential polymerization process. The term "sequential polymerization process", in the present application, indicates that the propylene polymer fractions are produced in a process comprising at least two reactors connected in series. In one preferred embodiment the term "sequential polymerization process" indicates, in the present application, that the reaction mixture of the first reactor, i.e. the first propylene polymer fraction with unreacted monomers, is conveyed, preferably directly conveyed; into a second reactor where a second propylene polymer fraction is obtained.

Accordingly, in the process according to the invention:
  i—the first propylene polymer fraction obtained in the first reactor generally comprises a first propylene polymer which is produced in said first reactor,
  ii—the second propylene polymer fraction obtained in the second reactor generally comprises a second propylene polymer which is produced in said second reactor.

The material produced after the second reactor is the sum of (co)polymers produced in the first reactor and in the second reactor.

Accordingly, the present process comprises at least a first reactor and a second reactor. The process may comprise at least one additional polymerization reactor subsequent to the second reactor. In one specific embodiment the process according to the invention consists of two polymerization reactors, i.e. a first reactor and a second reactor. The term "polymerization reactor" shall indicate that the main polymerization takes place. Thus, in case the process consists of two or more polymerization reactors, this definition does not exclude the option that the overall process comprises a pre-polymerization step in a pre-polymerization reactor. The term "consists of" is only a closing formulation in view of the main polymerization reactors.

In case the overall process according to the invention comprises a pre-polymerization reactor, the term "first propylene polymer fraction" means the sum of (co)polymer produced in the pre-polymerization reactor and the (co)polymer produced in the first reactor.

The reactors are generally selected from slurry and gas phase reactors. The first reactor is preferably a slurry reactor and can be any continuous or simple stirred batch tank reactor or loop reactor operating in bulk polymerization or slurry polymerization. By "bulk polymerization" it is meant a process where the polymerization is conducted in a liquid monomer essentially in the absence of an inert diluent. However, it is known to a person skilled in the art, that the monomers used in commercial production are never pure but always contain aliphatic hydrocarbons as impurities. For instance, the propylene monomer may contain up to 5% of propane as an impurity. Thus, "bulk polymerization" preferably means a polymerization in a reaction medium that comprises at least 60% (wt/wt) of the monomer. According to the present invention, the first reactor is more preferably a loop reactor.

The second reactor is preferably a gas-phase reactor. Said gas-phase reactor can be any mechanically mixed or fluidized bed reactor or settled bed reactor. Preferably, the gas-phase reactor comprises a mechanically agitated fluidized bed reactor with gas velocities of at least 0.2 m/sec. The gas-phase reactor of a fluidized bed type reactor can further include a mechanical agitator to facilitate the mixing within the fluidized bed.

The potentially subsequent polymerization reactor or reactors is/are preferably a gas-phase reactor.

A preferred polymerization process is a "loop-gas phase"-process, such as developed by Borealis and known as BORSTAR™ technology. Examples of this polymerization process are described in EP0887379, WO2004/000899, WO2004/111095 and WO99/24478.

When the overall process according to the invention comprises a pre-polymerization reactor, said pre-polymerization step takes place prior to the polymerization in the first reactor. The pre-polymerization step takes place in a pre-polymerization reactor wherein pre-(co)polymerization of propylene is conducted. The pre-polymerization reactor is of smaller size compared to the first reactor, the second reactor and the subsequent polymerization reactor or reactors, according to the invention, respectively. The reaction volume of the pre-polymerization reactor can be, for example, between 0.001% and 10% of the reaction volume of the first reactor, like the loop reactor. In said pre-polymerization reactor, the pre-(co)polymerization of propylene is performed in bulk or slurry, producing a propylene (co)polymer.

The operating temperature in the pre-polymerization reactor is in the range of 0 to 60° C., preferably in the range of 15 to 50° C., more preferably in the range of 18 to 35° C.

The pressure in the pre-polymerization reactor is not critical but must be sufficiently high to maintain the reaction mixture in liquid phase. Thus, the pressure in the pre-polymerization reactor may be in the range of 20 to 100 bar, preferably in the range of 30 to 70 bar.

Hydrogen can be added in the pre-polymerization reactor in order to control the molecular weight, and thus the melt flow rate $MFR_2$ of the propylene (co)polymer produced in the pre-polymerization reactor.

In the first reactor of the process according to the invention, a monomer feed comprised of propylene and optionally one or more comonomers selected from ethylene and $C_4$-$C_{10}$ alpha-olefins is fed. In case the pre-polymerization step is present in the process, the propylene (co)polymer produced in the pre-polymerization reactor, is also fed into the first reactor. In the first reactor, a first propylene polymer fraction is obtained.

The first propylene polymer fraction generally has a comonomer content selected from ethylene and $C_4$-$C_{10}$ alpha-olefins in the range of from 0.0 to 1.8 wt %, preferably in the range of from 0.1 to 1.0 wt %, more preferably in the range of from 0.1 to 8.0 wt %, especially 0.3 to 1.5 wt % even 0.5 to 1.2 wt %. wt %, relative to the total amount of monomers present in the first propylene polymer fraction. The first polymer fraction is therefore preferably a copolymer, especially a copolymer with ethylene as the sole comonomer.

Generally, the first propylene polymer fraction has a melt flow rate ($MFR_2$) in the range of from 12 to 40 g/10 min, preferably in the range of from 15 to 35 g/10 min, more preferably in the range of from 15 to 30 g/10 min. The $MFR_2$ is determined according to ISO 1133, at a temperature of 230° C. and under a load of 2.16 kg.

The operating temperature in the first reactor is generally in the range of 62 to 85° C., preferably in the range of 65 to 82° C., more preferably in the range of 67 to 80° C.

Typically the pressure in the first reactor is in the range of 20 to 80 bar, preferably in the range of 30 to 70 bar, more preferably in the range of 35 to 65 bar.

Hydrogen can be added in the first reactor in order to control the molecular weight, and thus the melt flow rate $MFR_2$ of the first propylene polymer fraction obtained in said first reactor.

Generally, the hydrogen/propylene ($H_2/C_3$) ratio in the first reactor is in the range of 1.5 to 6.0 mol/kmol, preferably in the range of from 1.6 to 5.5 mol/kmol, more preferably in the range of from 1.7 to 5.0 mol/kmol.

Generally, the ratio of one or more comonomers (selected from ethylene and $C_4$-$C_{10}$ alpha-olefins) to $C_3$ (process comonomer ratio) in the first reactor is below 14.0 mol/kmol, preferably in the range of from 1.0 to 12.0 mol/kmol, more preferably in the range of from 1.0 to 10.0 mol/kmol.

Generally, the reaction mixture of the first reactor is conveyed, preferably directly conveyed; into the second reactor. By "directly conveyed" is meant a process wherein the reaction mixture of the first reactor is led directly to the next polymerization step, i.e. the second reactor. Monomers comprising propylene and one or more comonomers selected from ethylene and $C_4$-$C_{10}$ alpha-olefins are fed into the second reactor. In the second reactor, a second propylene polymer fraction is obtained.

The second propylene polymer fraction contains a comonomer selected from ethylene and $C_4$-$C_{10}$ alpha-olefins.

The operating temperature in the second reactor is generally in the range of 70 to 95° C., preferably in the range of 75 to 90° C., more preferably in the range of 78 to 88° C.

Typically the pressure in the second reactor is in the range of 5 to 50 bar, preferably in the range of 15 to 40 bar.

Hydrogen can be added in the second reactor in order to control the molecular weight, and thus the melt flow rate $MFR_2$ of the second propylene polymer fraction obtained in said second reactor.

Generally, the hydrogen/propylene ($H_2/C_3$) ratio in the second reactor is in the range of 12.0 to 70.0 mol/kmol, preferably in the range of 15.0 to 60.0 mol/kmol, more preferably in the range of 16.0 to 50.0 mol/kmol.

Generally, the ratio of one or more comonomers (selected from ethylene and $C_4$-$C_{10}$ alpha-olefins) to $C_3$ (process comonomer ratio) in the second reactor is in the range of 15.0 to 85.0 mol/kmol, preferably in the range of 20.0 to 80.0 mol/kmol, more preferably in the range of 25.0 to 75.0 mol/kmol.

In the process according to the invention, the propylene polymer produced in the first reactor, i.e. the first propylene polymer, is generally produced in an amount in the range of from 25 to 75 wt %, preferably in an amount in the range of from 28 to 72 wt %, more preferably in an amount in the range of from 30 to 70 wt %.

In the process according to the invention, the propylene polymer produced in the second reactor, i.e. the second propylene polymer, is generally produced in an amount in the range of from 25 to 75 wt %, preferably in an amount in the range of from 28 to 72 wt %, more preferably in an amount in the range of from 30 to 70 wt %. The amount of the first propylene polymer and the second propylene polymer is relative to the total sum of first propylene polymer and second propylene polymer.

In a preferred embodiment, the one or more comonomers selected from ethylene and $C_4$-$C_{10}$ alpha-olefins are incorporated into the reactors of the inventive process in different amounts resulting in a polypropylene composition having bimodal comonomer composition with respect to the comonomer content of each of the propylene polymers comprised in said polypropylene composition, i.e. first propylene polymer and second propylene polymer.

In the process according to the invention, the one or more comonomers are selected from ethylene and $C_4$-$C_{10}$ alpha-olefins, preferably selected from ethylene and $C_4$-$C_8$ alpha-olefins, more preferably selected from ethylene and $C_4$-$C_6$ alpha-olefins, even more preferably selected from one or more comonomers comprising ethylene, further even more preferably the comonomer is selected from solely ethylene, through the present invention.

The comonomer ratio is less than 0.35, preferably less than 0.30, especially less than 0.25. The comonomer ratio is preferably at least 0.1. This ratio is the ratio of comonomer content in fraction 1/final comonomer content. Having a higher comonomer content in the gas phase fraction (and hence the final polymer) vs the first fraction improves impact behaviour without damaging the crystallisation speed.

After the polymerization in the second reactor step, the material obtained in the second reactor is recovered by conventional procedures know by the person skilled in the art. The recovered material according to the invention is generally in the form of particles.

Second Embodiment

In a second embodiment, the process of the invention employs at least three main reactors:
i—the first propylene polymer fraction obtained in the first reactor generally comprises a first propylene polymer which is produced in said first reactor,
ii—the second propylene polymer fraction obtained in the second reactor generally comprises a second propylene polymer which is produced in said second reactor,
iii—the third propylene polymer fraction obtained in the third reactor generally comprises a third propylene polymer which is produced in said third reactor.

Accordingly, the present process may also comprise at least a first reactor, a second reactor and a third reactor. In one specific embodiment, the process according to the invention consists of three polymerization reactors i.e. a first reactor, a second reactor and a third reactor. The term "polymerization reactor" shall indicate that the main polymerization takes place. Thus, in case the process consists of three or more polymerization reactors, this definition does not exclude the option that the overall process comprises for instance a pre-polymerization step in a pre-polymerization reactor. The term "consists of" is only a closing formulation in view of the main polymerization reactors. In case the overall process according to the invention comprises a pre-polymerization reactor, the term "first propylene polymer fraction" means the sum of (co)polymer produced in the pre-polymerization reactor and the (co)polymer produced in the first reactor.

The reactors are generally selected from slurry and gas phase reactors. The first reactor is preferably a slurry reactor and can be any continuous or simple stirred batch tank reactor or loop reactor operating in bulk polymerization or slurry polymerization. By "bulk polymerization" it is meant a process where the polymerization is conducted in a liquid monomer essentially in the absence of an inert diluent. However, it is known to a person skilled in the art, that the monomers used in commercial production are never pure but always contain aliphatic hydrocarbons as impurities. For instance, the propylene monomer may contain up to 5% of propane as an impurity. Thus, "bulk polymerization" preferably means a polymerization in a reaction medium that comprises at least 60% (wt/wt) of the monomer. According to the present invention, the first reactor is more preferably a loop reactor.

The second reactor is preferably a first gas-phase reactor. Said first gas-phase reactor can be any mechanically mixed or fluidized bed reactor or settled bed reactor. Preferably, the first gas-phase reactor comprises a mechanically agitated fluidized bed reactor with gas velocities of at least 0.2 m/sec. The first gas-phase reactor of a fluidized bed type reactor can further include a mechanical agitator to facilitate the mixing within the fluidized bed.

The third reactor is preferably a second gas-phase reactor. Said second gas-phase reactor can be any mechanically mixed or fluidized bed reactor or settled bed reactor. Preferably the second gas-phase reactor comprises a mechanically agitated fluidized bed reactor with gas velocities of at least 0.2 m/sec. The second gas-phase reactor of a fluidized bed type reactor can further include a mechanical agitator to facilitate the mixing within the fluidized bed.

The potentially subsequent polymerization reactor or reactors is/are preferably a gas-phase reactor.

A preferred polymerization process is a "loop-gas-gas-phase"-process, such as developed by Borealis and known as BORSTAR™ technology.

When the overall process according to the invention comprises a pre-polymerization reactor, said pre-polymerization step takes place prior to the polymerization in the first reactor. The pre-polymerization step takes place in a pre-polymerization reactor wherein pre-(co)polymerization of propylene is conducted. The pre-polymerization reactor is of smaller size compared to the first reactor, the second reactor, the third reactor and the subsequent polymerization reactor or reactors, according to the invention, respectively. The reaction volume of the pre-polymerization reactor can be, for example, between 0.001% and 10% of the reaction volume of the first reactor, like the loop reactor. In said pre-polymerization reactor, the pre-(co)polymerization of propylene is performed in bulk or slurry, producing a propylene (co)polymer.

The operating temperature in the pre-polymerization reactor is in the range of 0 to 60° C., preferably in the range of 15 to 50° C., more preferably in the range of 18 to 35° C.

The pressure in the pre-polymerization reactor is not critical but must be sufficiently high to maintain the reaction mixture in liquid phase. Thus, the pressure in the pre-polymerization reactor may be in the range of 20 to 100 bar, preferably in the range of 30 to 70 bar.

Hydrogen can be added in the pre-polymerization reactor in order to control the molecular weight, and thus the melt flow rate $MFR_2$ of the propylene (co)polymer produced in the pre-polymerization reactor.

In the first reactor of the process according to the invention, a monomer feed comprised of propylene and optionally one or more comonomers selected from ethylene and $C_4$-$C_{10}$ alpha-olefins is fed. In case the pre-polymerization step is present in the process, the propylene (co)polymer produced in the pre-polymerization reactor, is also fed into the first reactor. In the first reactor, a first propylene polymer fraction is obtained.

The first propylene polymer fraction generally has a comonomer content selected from ethylene and $C_4$-$C_{10}$ alpha-olefins in the range of from 0.0 to 1.8 wt %, preferably in the range of from 0.1 to 1.0 wt %, more preferably in the range of from 0.1 to 8.0 wt %, especially 0.3 to 1.5 wt % even 0.5 to 1.2 wt %.

Generally, the first propylene polymer fraction has a melt flow rate ($MFR_2$) in the range of from 12 to 40 g/10 min, preferably in the range of from 15 to 35 g/10 min, more preferably in the range of from 15 to 30 g/10 min. The $MFR_2$ is determined according to ISO 1133, at a temperature of 230° C. and under a load of 2.16 kg.

The operating temperature in the first reactor is generally in the range of 62 to 85° C., preferably in the range of 65 to 82° C., more preferably in the range of 67 to 80° C.

Typically the pressure in the first reactor is in the range of 20 to 80 bar, preferably in the range of 30 to 70 bar, more preferably in the range of 35 to 65 bar.

Hydrogen can be added in the first reactor in order to control the molecular weight, and thus the melt flow rate $MFR_2$ of the first propylene polymer fraction obtained in said first reactor.

Generally, the hydrogen/propylene ($H_2/C_3$) ratio in the first reactor is in the range of 1.5 to 6.0 mol/kmol, preferably in the range of from 1.6 to 5.5 mol/kmol, more preferably in the range of from 1.7 to 5.0 mol/kmol.

Generally, the ratio of one or more comonomers (selected from ethylene and $C_4$-$C_{10}$ alpha-olefins) to $C_3$ in the first reactor is below 10.0 mol/kmol, preferably in the range of from 0.0 to 8.0 mol/kmol, more preferably in the range of from 0.0 to 7.5 mol/kmol.

Generally, the reaction mixture of the first reactor is conveyed, preferably directly conveyed; into the second reactor. By "directly conveyed" is meant a process wherein the reaction mixture of the first reactor is led directly to the next polymerization step, i.e. the second reactor. Monomers comprising propylene and one or more comonomers selected from ethylene and $C_4$-$C_{10}$ alpha-olefins are fed into the second reactor. In the second reactor, a second propylene polymer fraction is obtained.

The second propylene polymer fraction comprises a comonomer content selected from ethylene and $C_4$-$C_{10}$ alpha-olefins. The material produced after the second reactor (i.e. the sum of the first and second polymer fractions) may have a comonomer content in the range of from 0.3 to 2.0 wt %, preferably in the range of from 0.5 to 1.7 wt %, more preferably in the range of from 0.6 to 1.5 wt %.

Generally, the material produced after the second reactor (i.e. the sum of the first and second polymer fractions) may have a melt flow rate ($MFR_2$) in the range of from 11 to 60 g/10 min, preferably in the range of from 15 to 40 g/10 min, more preferably in the range of from 17 to 35 g/10 min. The $MFR_2$ is determined according to ISO 1133, at a temperature of 230° C. and under a load of 2.16 kg.

The operating temperature in the second reactor is generally in the range of 70 to 95° C., preferably in the range of 75 to 90° C., more preferably in the range of 78 to 88° C.

Typically the pressure in the second reactor is in the range of 5 to 50 bar, preferably in the range of 15 to 40 bar.

Hydrogen can be added in the second reactor in order to control the molecular weight, and thus the melt flow rate $MFR_2$ of the second propylene polymer fraction obtained in said second reactor.

Generally, the hydrogen/propylene ($H_2/C_3$) ratio in the second reactor is in the range of 12.0 to 70.0 mol/kmol, preferably in the range of 15.0 to 60.0 mol/kmol, more preferably in the range of 16.0 to 50.0 mol/kmol.

Generally, the ratio of one or more comonomers (selected from ethylene and $C_4$-$C_{10}$ alpha-olefins) to $C_3$ in the second reactor is in the range of 4.5 to 20.0 mol/kmol, preferably in the range of 5.0 to 18.0 mol/kmol, more preferably in the range of 5.5 to 17.0 mol/kmol.

Generally, the reaction mixture of the second reactor is conveyed, preferably directly conveyed; into the third reactor. By "directly conveyed" is meant a process wherein the reaction mixture of the second reactor is led directly to the next polymerization step, i.e. the third reactor. Monomers comprising propylene and one or more comonomers selected from ethylene and $C_4$-$C_{10}$ alpha-olefins are fed into the third reactor. In the third reactor, a third propylene polymer fraction is obtained.

The third propylene copolymer fraction generally comprises a comonomer selected from ethylene and $C_4$-$C_{10}$ alpha-olefins.

The operating temperature in the third reactor is generally in the range of 70 to 95° C., preferably in the range of 75 to 90° C., more preferably in the range of 78 to 88° C.

Typically, the pressure in the third reactor is in the range of 5 to 50 bar, preferably in the range of 15 to 40 bar.

Hydrogen can be added in the third reactor in order to control the molecular weight, and thus the melt flow rate $MFR_2$ of the third propylene polymer fraction obtained in said third reactor.

Generally the hydrogen/propylene ($H_2/C_3$) ratio in the third reactor is in the range of 15.0 to 80.0 mol/kmol, preferably in the range of 17.0 to 70.0 mol/kmol, more preferably in the range of 19.0 to 60.0 mol/kmol.

Generally the ratio of one or more comonomers (selected from ethylene and $C_4$-$C_{10}$ alpha-olefins) to $C_3$ in the third reactor is in the range of 45.0 to 200.0 mol/kmol, preferably in the range of 50.0 to 180.0 mol/kmol, more preferably in the range of 55.0 to 170.0 mol/kmol.

In the process according to the invention, the propylene polymer produced in the first reactor i.e. the first propylene polymer is generally produced in an amount in the range of from 20 to 55 wt %, preferably in an amount in the range of from 25 to 55 wt %, more preferably in an amount in the range of from 30 to 50 wt %.

In the process according to the invention, the propylene polymer produced in the second reactor i.e. the second propylene polymer is generally produced in an amount in the range of from 30 to 70 wt %, preferably in an amount in the range of from 35 to 70 wt %, more preferably in an amount in the range of from 35 to 55 wt %.

In the process according to the invention, the propylene polymer produced in the third reactor i.e. the third propylene polymer is generally produced in an amount in the range of from 6 to 20 wt %, preferably in an amount in the range of from 7 to 15 wt %, more preferably in an amount in the range of from 8 to 15 wt %. The amount of the first propylene polymer, the second propylene polymer and the third propylene polymer is relative to the total sum of first propylene polymer, second propylene polymer and third propylene polymer comprised in the material.

In a preferred embodiment, the one or more comonomers selected from ethylene and $C_4$-$C_{10}$ alpha-olefins are incorporated into the reactors of the inventive process in different amounts resulting in a polypropylene composition having trimodal comonomer distribution with respect to the comonomer content of each of the propylene polymers comprised in said composition, i.e. first propylene polymer, second propylene polymer and third propylene polymer.

In the process according to the invention, the one or more comonomers are selected from ethylene and $C_4$-$C_{10}$ alpha-olefins, preferably selected from ethylene and $C_4$-C8 alpha-olefins, more preferably selected from ethylene and $C_4$-$C_6$ alpha-olefins, even more preferably selected from one or more comonomers comprising ethylene, further even more preferably the comonomer is selected from solely ethylene, through the present invention.

The comonomer ratio is less than 0.35, preferably less than 0.3, especially less than 0.25. The comonomer ratio is preferably at least 0.1. This ratio is the comonomer content in fraction 1/final comonomer content. Having a higher comonomer content in the gas phase fraction vs the first fraction improves impact behaviour without damaging the crystallisation speed.

After the polymerization in the third reactor step, the polymer obtained in the third reactor is recovered by conventional procedures know by the person skilled in the art. The recovered polymer according to the invention is generally in the form of particles.

Catalyst

Generally, a polymerization catalyst is present in the process according to the invention. The polymerization catalyst is preferably a Ziegler-Natta catalyst. Generally, the polymerization Ziegler-Natta catalyst comprises one or more compounds of a transition metal (TM) of Group 4 to 6 as defined in IUPAC version 2013, like titanium, further a Group 2 metal compound, like a magnesium compound and an internal donor (ID).

The components of the catalyst may be supported on a particulate support, such as for example an inorganic oxide, like for example silica or alumina. Alternatively, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

Preferably, a specific type of Ziegler-Natta catalyst is present in the process according to the invention. In this specific type of Ziegler-Natta catalyst, it is essential that the internal donor is a non-phthtic compound. Preferably, through the whole specific type of Ziegler-Natta catalyst preparation no phthalate compound is used, thus the final specific type of Ziegler-Natta catalyst does not contain any phthalic compound. Thus, the specific type of Ziegler-Natta catalyst is free of phthalic compound. Therefore, the polymer obtained in the second reactor of the process according to the invention is free of phthalic compound.

Generally, the specific type of Ziegler-Natta catalyst comprises an internal donor (ID) which is chosen to be a non-phthalic compound, in this way the specific type of Ziegler-Natta catalyst is completely free of phthalic compound. Further, the specific type of Ziegler-Natta catalyst can be a solid catalyst preferably being free of any external support material, like silica or $MgCl_2$, and thus the solid catalyst is self-supported.

The solid catalyst is obtainable by the following general procedure:
a) providing a solution of
  $a_1$) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or
  $a_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
  $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
  $a_4$) Group 2 metal alkoxy compound of formula $M(OR_1)_n(OR_2)_mX_{2-n-m}$ or mixture of Group 2 alkoxides $M(OR_1)_nX_{2-n'}$ and $M(OR_2)_mX_{2-m'}$, where M is a Group 2 metal, X is halogen, $R_1$ and $R_2$ are different alkyl groups of 2 to 16 carbon atoms, and $0 \leq n < 2$, $0 \leq m < 2$ and $n+m+(2-n-m)=2$, provided that n and m are not 0 simultaneously, $0 < n' < 2$ and $0 < m' \leq 2$; and
b) adding said solution from step a) to at least one compound of a transition metal of Group 4 to 6 and
c) obtaining the solid catalyst component particles, and adding a non-phthalic internal electron donor (ID) at least in one step prior to step c).

The internal donor (ID) or precursor thereof is preferably added to the solution of step a) or to the transition metal compound before adding the solution of step a).

According to the procedure above, the solid catalyst can be obtained via a precipitation method or via an emulsion—solidification method depending on the physical conditions, especially the temperature used in steps b) and c). An emulsion is also called liquid-liquid two-phase system. In both methods (precipitation or emulsion-solidification) the catalyst chemistry is the same.

In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention.

In step a) preferably the solution of $a_2$) or $a_3$) is used, i.e. a solution of (Ax') or a solution of a mixture of (Ax) and (Bx).

Preferably, the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as already prepared magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched $C_2$-$C_{16}$ alkyl residue, preferably a $C_4$ to $C_{10}$ alkyl residue, more preferably a $C_6$ to $C_8$ alkyl residue. The most preferred monohydric alcohol is 2-ethyl-1-hexanol or octanol.

Preferably, a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different $C_1$-$C_{20}$ alkyl groups, preferably $C_2$-$C_{10}$ alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred, dialkyl magnesiums are butyl octyl magnesium or butyl ethyl magnesium.

It is also possible that the magnesium compound reacts in addition to the alcohol (A) and alcohol (B) with a polyhydric alcohol (C) of formula R"(OH)$_m$ to obtain said magnesium alkoxide compound. Preferred polyhydric alcohols, if used, are alcohols, wherein R" is a straight-chain, cyclic or branched $C_2$ to $C_{10}$ hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particularly preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal (TM) compound of Group 4 to 6 as defined in IUPAC version 2013 is preferably a titanium compound, most preferably a titanium halide, like $TiCl_4$.

The non-phthalic internal donor (ID) used in the preparation of the specific type of Ziegler-Natta catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives thereof and/or mixtures thereof. Preferred examples are e.g. substituted maleates and citraconates, most preferably citraconates.

Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it. Preferably, surfactants are acrylic or methacrylic polymers. Particularly preferred are unbranched $C_{12}$ to $C_{20}$ (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion—solidification method may be washed at least once, preferably at least twice, most preferably at least three times. The washing can take place with an aromatic and/or aliphatic hydrocarbon, preferably with toluene, heptane or pentane. Washing is also possible with $TiCl_4$ optionally combined with the aromatic and/or aliphatic hydrocarbon. Washing liquids can also contain donors and/or compounds of Group 13, like trialkyl aluminium, halogenated alkyl aluminium compounds or alkoxy aluminium compounds. Aluminium compounds can also be added during the catalyst synthesis. The catalyst can further be dried, for example by evaporation or flushing with nitrogen or it can be slurried to an oily liquid without any drying step.

The finally obtained specific type of Ziegler-Natta catalyst is desirably obtained in the form of particles having generally an average particle size range of 5 to 200 μm, preferably 10 to 100 μm. The particles are generally compact with low porosity and have generally a surface area below 20 g/m², more preferably below 10 g/m². Typically, the amount of Ti present in the catalyst is in the range of 1 to 6 wt %, the amount of Mg is in the range of 10 to 20 wt % and the amount of internal donor present in the catalyst is in the range of 10 to 40 wt % of the catalyst composition. A detailed description of the preparation of the catalysts used in the present invention is disclosed in WO2012/007430, EP2610271 and EP2610272 which are incorporated here by reference.

An external donor (ED) is preferably present as a further component in the polymerization process according to the invention. Suitable external donors (ED) include certain silanes, ethers, esters, amines, ketones, heterocyclic compounds and blends of these. It is especially preferred to use a silane. It is most preferred to use silanes of the general formula (I)

$$R^a_p R^b_q Si(OR^c)_{(4-p-c)} \quad (I)$$

wherein $R^a$, $R^b$ and $R^c$ denote a hydrocarbon radical, in particular an alkyl or cycloalkyl group, and wherein p and q are numbers ranging from 0 to 3 with their sum (p+q) being equal to or less than 3. $R^a$, $R^b$ and $R^c$ can be chosen independently from one another and can be the same or different. Specific examples of silanes according to formula (I) are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. Another most preferred silane is according to the general formula (II)

$$Si(OCH_2CH_3)_3(NR^3R^4) \quad (II)$$

wherein $R^3$ and $R^4$ can be the same or different and represent a linear, branched or cyclic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

Generally, in addition to the Ziegler-Natta catalyst or the specific type of Ziegler-Natta catalyst and the optional external donor (ED) a co-catalyst (Co) can be present in the polymerization process according to the invention. The co-catalyst is preferably a compound of group 13 of the periodic table (IUPAC, version 2013), such as for example an aluminum compound, e.g. an organo aluminum or aluminum halide compound. An example of a suitable organo aluminium compound is an aluminum alkyl or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Generally, the molar ratio between the co-catalyst (Co) and the external donor (ED) [Co/ED] and/or the molar ratio between the co-catalyst (Co) and the transition metal (TM) [Co/TM] is carefully chosen for each process. The molar ratio between the co-catalyst (Co) and the external donor (ED), [Co/ED] can suitably be in the range of 2.5 to 50.0 mol/mol, preferably in the range of 4.0 to 35.0 mol/mol, more preferably in the range of 5.0 to 30.0 mol/mol. A suitable lower limit can be 2.5 mol/mol, preferably 4.0 mol/mol, more preferably 5.0 mol/mol. A suitable upper limit can be 50.0 mol/mol, preferably 35.0 mol/mol, more preferably 30.0 mol/mol. The lower and upper indicated values of the ranges are included.

The molar ratio between the co-catalyst (Co) and the transition metal (TM), [Co/TM] can suitably be in the range of 20.0 to 500.0 mol/mol, preferably in the range of 50.0 to 400.0 mol/mol, more preferably in the range of 100.0 to 300.0 mol/mol. A suitable lower limit can be 20.0 mol/mol, preferably 50.0 mol/mol, more preferably 100.0 mol/mol. A suitable upper limit can be 500.0 mol/mol, preferably 400.0 mol/mol, more preferably 300.0 mol/mol. The lower and upper indicated values of the ranges are included.

Polypropylene Composition

According to the present invention, the material produced after the second reactor (i.e. the sum of the first and second polymer fractions) or the material produced after the third reactor (i.e. the sum of the first to third polymer fractions) may be recovered from the polymerization process. It can be extruded in the presence of at least one nucleating agent in order to produce the required polypropylene composition for cap or closure manufacture.

The extruder, where the extrusion step is carried out, may be any extruder known in the art. The extruder may thus be a single screw extruder; a twin screw extruder, such as a co-rotating twin screw extruder or a counter-rotating twin screw extruder; or a multi-screw extruder, such as a ring extruder. Preferably the extruder is a single screw extruder or a twin screw extruder. Especially preferred extruder is a co-rotating twin screw extruder.

The extruder typically comprises a feed zone, a melting zone, a mixing zone and optionally a die zone.

The extruder typically has a length over diameter ratio, L/D, of up to 60:1, preferably of up to 40:1.

The extruder may also have one or more feed ports for introducing further components, such as for example additives, into the extruder. The location of such additional feed ports depends on the type of material added through the port.

Examples of additives include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer Tropsch waxes, montan-based waxes, fluoro-based compounds, or paraffin waxes), as well as slip and antiblocking agents (for example erucamide, oleamide, talc, natural silica and synthetic silica or zeolites) and mixtures thereof.

Generally, the total amount of additives introduced into the extruder during the process according to the present invention, is not more than 5.0 wt %, preferably not more than 2.0 wt %, more preferably not more than 1.5 wt %. The amount of additives is relative to the total amount of polypropylene composition introduced into the extruder.

In the process according to the invention, the polymer available after formation of the second propylene polymer fraction or third propylene polymer fraction is extruded at a temperature which is higher than the melting temperature of the polymer but lower than the decomposition temperature of the polymer. Suitably, the polymer composition is extruded at a temperature at least 30° C. higher than the melting temperature of the polymer composition, preferably the polymer composition is extruded at a temperature at least 40° C. higher than the melting temperature of the polymer composition, more preferably the polymer composition is extruded at a temperature at least 50° C. higher than the melting temperature of the polymer composition, but lower than the decomposition temperature of the polymer composition, i.e. lower than 300° C. Most preferred temperatures are 200 to 250° C., such as 220 to 240° C.

In the process according to the invention, the polymer composition is extruded in the presence of an amount of the at least one nucleating agent, preferably in the range of from 0.01 to 1.0 wt %, preferably in the range of from 0.03 to 0.9 wt %, more preferably in the range of from 0.05 to 0.8 wt %. The amount of the at least one nucleating agent is relative to the total amount of polypropylene composition according to the invention.

The nucleating agent is generally selected from the group consisting of:
  (i) salts of monocarboxylic acids and polycarboxylic acids, e.g. sodium benzoate or aluminum tert-butylbenzoate,
  (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol,
  (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate],
  (iv) vinylcycloalkane polymer and vinylalkane polymer, and
  (v) mixtures thereof.

Preferably, the nucleating agent is a dibenzylidenesorbitol (e.g. 1,3:2,4 dibenzylidenesorbitol) or a $C_1$-$C_8$-alkyl-substituted dibenzylidenesorbitol derivative, such as methyldibenzylidenesorbitol, ethyldibenzylidenesorbitol or dimethyldibenzylidenesorbitol (e.g. 1,3:2,4 di(methylbenzylidene) sorbitol) or a substituted nonitol-derivative, such as 1,2,3,-trideoxy-4,6:5,7-bis-O-[(4-propylphenyl) methylene]-nonitol.

The at least one nucleating agent is generally fed into the extruder via the feed zone. However, the at least one nucleating agent may be fed into the extruder via the one or more feed ports comprised in the extruder, e.g., via a side feeder.

At the end of the extruder, a polypropylene composition melt is obtained. The inventive polypropylene composition melt might then be passed through a die in the optional die zone of the extruder. When the inventive polypropylene composition melt is passed through the die it is generally further cooled down and pelletized.

The die zone typically comprises a die plate, which is generally a thick metal disk having multiple holes. The holes are parallel to the screw axis.

The pelletizer is generally a strand pelletizer or an underwater pelletizer.

In any embodiment, the polypropylene composition obtainable, preferably obtained, by the process according to the invention generally has one comonomer only, ethylene.

In any embodiment, the polypropylene composition obtainable, preferably obtained by the process according to the invention generally has a comonomer content in the range of from 2.2 to 5.0 wt %, preferably in the range of from 2.5 to 4.8 wt %, more preferably in the range of from 2.8 to 4.5 wt %. Most preferred amounts are 3.2 to 4.2 or 3.4 to 4.0 wt %. The comonomer content is relative to the total amount of monomers present in the polypropylene composition.

In any embodiment, the polypropylene composition obtainable, preferably obtained, by the process according to the invention has a melt flow rate ($MFR_2$) in the range of from 12 to 60 g/10 min, preferably in the range of from 15 to 35 g/10 min, more preferably in the range of from 15 to 30 g/10 min. The $MFR_2$ is determined according to ISO 1133, at a temperature of 230° C. and under a load of 2.16 kg.

In any embodiment, the polypropylene composition preferably has a crystallisation temperature (Tc) of at least 90° C. when subjected to a cooling rate of 10 K/s.

In any embodiment, the polypropylene composition preferably has a crystallisation temperature (Tc) of at least 55° C. when subjected to a cooling rate of 100 K/s. In any embodiment, the polypropylene composition preferably has a crystallisation temperature (Tc) of at least 40° C. when subjected to a cooling rate of 300 K/s.

The polypropylene composition preferably has a crystallisation temperature (Tc) of at least 95° C. when subjected to a cooling rate of 10 K/s.

In any embodiment, the polypropylene composition preferably has a crystallisation temperature (Tc) of at least 75° C. when subjected to a cooling rate of 100 K/s.

In any embodiment, the polypropylene composition preferably has a crystallisation temperature (Tc) of at least 55° C. when subjected to a cooling rate of 300 K/s.

In any embodiment, the polypropylene composition preferably has a crystallisation temperature (Tc) of at least 90° C. when subjected to a cooling rate of 10 K/s.,
  a crystallisation temperature (Tc) of at least 55° C. when subjected to a cooling rate of 100 K/s.; and
  a crystallisation temperature (Tc) of at least 40° C. when subjected to a cooling rate of 300 K/s.

In any embodiment, the polypropylene composition preferably has
  a crystallisation temperature (Tc) of 90 to 140° C. when subjected to a cooling rate of 10 K/s.,
  a crystallisation temperature (Tc) of 55 to 100° C. when subjected to a cooling rate of 100 K/s.; and
  a crystallisation temperature (Tc) of 40 to 80° C. when subjected to a cooling rate of 300 K/s.

In any embodiment, the polypropylene composition preferably has
  a crystallisation temperature (Tc) of at least 95° C. when subjected to a cooling rate of 10 K/s.,
  a crystallisation temperature (Tc) of at least 75° C. when subjected to a cooling rate of 100 K/s.; and
  a crystallisation temperature (Tc) of at least 55° C. when subjected to a cooling rate of 300 K/s.

In any embodiment, the polypropylene composition preferably has a crystallisation temperature (Tc) of at least 50° C. when subjected to a cooling rate in the range of 100 to 600 K/s.

In any embodiment and at any cooling rate, the polypropylene composition preferably has a crystallisation temperature (Tc) of less than 140° C.

Caps and Closures

The present invention requires the formation of a cap or closure from the polypropylene composition. Cap or closure preparation can occur via known methods, e.g. injection or compression moulding of the extruded polypropylene composition. A preferred article is a closure cap, a screw cap or a closure system for food or fluid packaging. Preferably the cap or closure is injection moulded.

A particular feature of the invention is that the polypropylene composition has high crystallisation temperature (Tc) across a range of cooling rates. It is especially preferred if the cooling rate during the cap or closure manufacturing process is between 50 to 600 K/s, such as 100 to 600 K/s, especially 100 to 300 K/s.

Such rapid cooling rates lead to quick cycle times. Whilst cycle times will depend on the cap or closure in question cycle times of less than 6.0 secs, e.g. 4.5 to 6.0 secs, especially 4.7 to 6.0 secs are envisaged. The term cycle time refers to the time between injection of the polypropylene composition into the mould, cooling the composition, ejecting the cap or closure that forms to the start of the injection of composition for the next article.

The invention will now be described with reference to the following non limiting examples and figures.

BRIEF DESCRIPTION OF THE FIGURES

FIG. 1 shows the relationship between crystallsiaiton temperature and cooling rate for the inventive and comparative examples.

FIG. 2(a) is a Schematic diagram of the CRYSTEX QC instrument and FIG. 2(b) shows elution of the EP copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene, The Column Advanstar Publications, February 2014. Pages 18-23).

EXAMPLES

I. Measuring Methods a) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene is determined at a temperature of 230° C. and under a load of 2.16 kg.

b) DSC Analysis

The crystallisation temperature is measured with a TA Instrument Q2000 differential scanning calorimetry device (DSC) according to ISO 11357/3 on 5 to 10 mg samples, under 50 mL/min of nitrogen atmosphere. Crystallisation temperatures were obtained in a heat/cool/heat cycle with a scan rate of 10° C./min between 30° C. and 225° C. Crystallisation temperatures were taken as the peaks of the endotherms and exotherms in the cooling step and the second heating step respectively.

Fast Scanning Calorimetry (FSC)

A power-compensation-type differential scanning calorimeter Flash DSC1 from MettlerToledo was used to analyze isothermally and non-isothermally the crystallization behavior in the range of cooling rates from $10^o$ to $10^3$ K s−1. The instrument was attached to a Huber intracooler TC45, to allow cooling down to about −100° C. The preparation of samples includes cutting of thin sections with thickness of 10 to 15 μm from the surface of pellets. The specimens were heated to 200° C., kept at this temperature for 0.1 s and cooled at different cooling rates to −33° C. which is below the glass transition temperature of the mobile amorphous fraction of iPP. The furnace of the instrument was purged with dry nitrogen gas at a flow rate of 30 mL/min. The sensors were subjected to the so called conditioning procedure which includes several heating and cooling runs. Afterwards, a temperature correction of the sensor was performed. Before loading the sample a thin layer of silicon oil was spread on the heating area of the sample sensor to improve the thermal contact between the sensor and the sample. The sensors are developed by Xensor Integration (Netherlands). Each sensor is supported by a ceramic base plate for easy handling. The total area of the chip is 5.0×3.3 $mm^2$; it contains two separate silicon nitride/oxide membranes with an area of 1.7×1.7 $mm^2$ and a thickness of 2.1 mm each, being surrounded by a silicon frame of 300 μm thickness, serving as a heat sink. In the present work additional calibrations were not performed. Further details to the technique as such are given here:

E. Iervolino, A. van Herwaarden, F. van Herwaarden, E. van de Kerkhof, P. van Grinsven, A. Leenaers, V. Mathot, P. Sarro. Temperature calibration and electrical characterization of the differential scanning calorimeter chip UFS1 for the Mettler-Toledo Flash DSC 1. Thermochim. Acta 522, 53-59 (2011). V. Mathot, M. Pyda, T. Pijpers, G. Poel, E. van de Kerkhof, S. van Herwaarden, F. van Herwaarden, A. Leenaers. The Flash DSC 1, a power compensation twin-type, chip-based fast scanning calorimeter (FSC): First findings of polymers. Thermochim. Acta 552, 36-45 (2011).

M. van Drongelen, T. Meijer-Vissers, D. Cavallo, G. Portale, G. Vanden Poel, R. Androsch R. Microfocus wide-angle X-ray scattering of polymers crystallized in a fast scanning chip calorimeter. Thermochim Acta 563, 33-37 (2013).

c) Comonomer Content

Poly(propylene-co-ethylene)—Ethylene Content by IR Spectroscopy

Quantitative infrared (IR) spectroscopy was used to quantify the ethylene content of the poly(ethylene-co-propene) copolymers through calibration to a primary method.

Calibration was facilitated through the use of a set of in-house non-commercial calibration standards of known ethylene contents determined by quantitative $^{13}C$ solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt % produced at either pilot or full scale under a variety of conditions. The calibration set was selected to reflect the typical variety of copolymers encountered by the final quantitative IR spectroscopy method.

Quantitative IR spectra were recorded in the solid-state using a Bruker Vertex 70 FTIR spectrometer. Spectra were recorded on 25×25 mm square films of 300 um thickness prepared by compression moulding at 180-210° C. and 4-6 mPa. For samples with very high ethylene contents (>50 mol %) 100 um thick films were used. Standard transmission FTIR spectroscopy was employed using a spectral range of 5000-500 $cm^{-1}$, an aperture of 6 mm, a spectral resolution of 2 $cm^{-1}$, 16 background scans, 16 spectrum scans, an interferogram zero filling factor of 64 and Blackmann-Harris 3-term apodisation.

Quantitative analysis was undertaken using the total area of the $CH_2$ rocking deformations at 730 and 720 $cm^{-1}$ ($A_Q$) corresponding to $(CH_2)_{>2}$ structural units (integration method G, limits 762 and 694 $cm^{-1}$). The quantitative band was normalised to the area of the CH band at 4323 $cm^{-1}$ (AR) corresponding to CH structural units (integration method G, limits 4650, 4007 $cm^{-1}$). The ethylene content in units of weight percent was then predicted from the normalised absorption ($A_Q/A_R$) using a quadratic calibration curve. The calibration curve having previously been constructed by ordinary least squares (OLS) regression of the normalised absorptions and primary comonomer contents measured on the calibration set.

Poly(propylene-co-ethylene)—Ethylene Content for Calibration Using $^{13}C$ NMR Spectroscopy Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (VVang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. The mole percent comonomer incorporation was calculated from the mole fraction: E [mol %]=100*fE. The weight percent comonomer incorporation was calculated from the mole fraction: E [wt %]=100* (fE*28.06)/((fE*28.06)+((1-fE)*42.08))

d) Xylene Soluble Content (XCS, Wt %)

The content of the polymer soluble in xylene is determined according to ISO 16152; 5$^{th}$ edition; 2005-07-01 at 25° C.

e) Tensile Modulus

Tensile Modulus is measured according to ISO 527-1: 2012/IS0527-2:2012 at 23° C. and at a cross head speed=50 mm/min; using injection moulded test specimens as described in EN ISO 1873-2 (dog bone shape, 4 mm thickness).

f) Charpy Notched Impact

Charpy notched impact strength is determined according to ISO 179/1eA at 23° C. on injection moulded test specimens as described in EN ISO 1873-2 (80×10×4 mm).

g) Haze

Haze is determined according to ASTM D1003 on injection moulded plaques having 1 mm thickness and 60×60 mm$^2$ area produced as described in EN ISO 1873-2.

h) Crystex Analysis

Crystalline and Soluble Fractions Method

The crystalline (CF) and soluble fractions (SF) of the polypropylene (PP) compositions as well as the comonomer content and intrinsic viscosities of the respective fractions were analysed by the CRYSTEX QC, Polymer Char (Valencia, Spain).

A schematic representation of the CRYSTEX QC instrument is shown in FIG. 2a. The crystalline and amorphous fractions are separated through temperature cycles of dissolution at 160° C., crystallization at 40° C. and re-dissolution in a 1,2,4-trichlorobenzene (1,2,4-TCB) at 160° C. as shown in FIG. 1b. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the Ethylene content in Ethylene-Propylene copolymers. 1R4 detector is calibrated with series of 8 EP copolymers with known Ethylene content in the range of 2 wt.-% to 69 wt.-% (determined by 13C-NMR) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 Wt %.

The intrinsic viscosity (IV) of the parent EP copolymer and its soluble and crystalline fractions are determined with a use of an online 2-capillary viscometer and are correlated to corresponding IV's determined by standard method in decalin according to ISO 1628. Calibration is achieved with various EP PP copolymers with IV=2-4 dL/g.

A sample of the PP composition to be analysed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 2a and 2b, a defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt %] of the PP composition. During the second injection the soluble fraction (at low temperature) and the crystalline fraction (at high temperature) with the crystallization cycle are measured (Wt % SF, Wt % C2, IV).

EP means ethylene propylene copolymer.
PP means polypropylene.

II. Inventive Example a) Catalyst ppreparation

For the preparation of the catalyst 3.4 litre of 2-ethylhexanol and 810 ml of propylene glycol butyl monoether (in a molar ratio 4/1) were added to a 20.0 l reactor. Then 7.8 litre of a 20.0% solution in toluene of BEM (butyl ethyl magnesium) provided by Crompton GmbH, were slowly added to the well stirred alcohol mixture. During the addition, the temperature was kept at 10.0° C. After addition, the temperature of the reaction mixture was raised to 60.0° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25.0° C. Mixing speed was adjusted to 170 rpm. 26.0 g of Mg-complex prepared above was added within 30 minutes keeping the temperature at 25.0° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25.0° C., after which the reactor temperature was raised to 90.0° C. within 30 minutes. The reaction mixture was stirred for a further 30 minutes at 90.0° C. Afterwards stirring was stopped and the reaction mixture was allowed to settle for 15 minutes at 90.0° C. The solid material was washed 5 times: washings were made at 80.0° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor
Wash 2: washing was made with a mixture of 30 ml of TiCl4 and 1 ml of donor.
Wash 3: washing was made with 100 ml of toluene.
Wash 4: washing was made with 60 ml of heptane.
Wash 5: washing was made with 60 ml of heptane under 10 minutes stirring.

Afterwards stirring was stopped and the reaction mixture was allowed to settle for 10 minutes while decreasing the temperature to 70° C. with subsequent siphoning, followed by $N_2$ sparging for 20 minutes to yield an air sensitive powder.

Inventive example (IE) was produced in a pilot plant with a prepolymerization reactor, one slurry loop reactor and two gas phase reactors. The solid catalyst component described above along with triethyl-aluminium (TEAL) as co-catalyst and dicyclopentyl dimethoxy silane (D-donor) as external donor, were used in the inventive process.

The polymerization process conditions and properties of the propylene polymer fractions are described in Table 1.

The polypropylene composition is then extruded with a nucleating agent in a co-rotating twin screw extruder type Coperion ZSK 40 (screw diameter 40 mm, L/D ratio 38). The temperatures in the extruder were in the range of 190-230° C. In the inventive example, 0.05 wt % of Irganox 1010 (Pentaerythrityl-tetrakis(3-(3',5'-di-tert. butyl-4-hydroxyphenyl)-propionate, CAS No. 6683-19-8, commercially available from BASF AG, Germany), 0.05 wt % of Irgafos 168 (Tris (2,4-di-t-butylphenyl) phosphite, CAS No. 31570-04-4, commercially available from BASF AG, Germany), 0.10 wt % of Calcium stearate (CAS. No. 1592-23-0, commercially available under the trade name Ceasit FI from Baerlocher GmbH, Germany) and 0.06 wt % of Glycerol monostearate (CAS No. 97593-29-8, commercially available with 90% purity under the trade name Grindsted PS 426 from Danisco A/S, Denmark), 0.17 wt % Millad 3988 (CAS No. 135861-56-2, Milliken) were added to the extruder as additives. 0.3 ppm of Poly Vinyl Cyclo Hexane (PVCH) was added via a nucleating masterbatch Said nucleating masterbatch is a PP-homopolymer, MFR 20, and comprises ca 15 ppm of PVCH as polymeric nucleating agent.

Following the extrusion step and after solidification of the strands in a water bath, the resulting polypropylene composition was pelletized in a strand pelletizer.

TABLE 1

Polymerization process conditions and properties of the propylene polymer fractions

|  |  | IE1 |
|---|---|---|
| Pre-polymerization reactor | | |
| Temperature | [° C.] | 30 |
| Catalyst feed | [g/h] | 4.4 |
| TEAL/propylene | [g/t propylene] | 170 |
| Residence Time | [min] | 20 |
| Loop reactor (first propylene polymer fraction) | | |
| Temperature | [° C.] | 70 |
| Pressure | [kPa] | 5400 |
| Split | [%] | 46.8 |
| $H_2/C_3$ ratio | [mol/kmol] | 1.9 |
| $C_2/C_3$ ratio | [mol/kmol] | 3.2 |
| $MFR_2$ | [g/10 min] | 22 |
| $C_2$ content after loop reactor | [wt %] | 0.5 |
| First gas-phase reactor - | | |
| Temperature | [° C.] | 80 |
| Pressure | [kPa] | 1820 |
| Split | [%] | 43.2 |
| $H_2/C_3$ ratio | [mol/kmol] | 27.1 |
| $C_2/C_3$ ratio | [mol/kmol] | 7.9 |
| $MFR_2$ | [g/10 min] | 17.4 |
| $C_2$ content after $1^{st}$ gas hase reactor | [wt %] | 1.4 |
| Second gas-phase reactor - | | |
| Temperature | [° C.] | 80 |
| Pressure | [kPa] | 2500 |
| Split | [%] | 10 |
| $H_2/C_3$ ratio | [mol/kmol] | 27.5 |
| $C_2/C_3$ ratio | [mol/kmol] | 68.9 |
| $MFR_2$ | [g/10 min] | 17.3 |
| $C_2$ content final | [wt %] | 2.5 |
| C2 ratio (final/fraction 1) |  | 0.2 |

*Split relates to the amount of propylene polymer produced in each specific reactor.

Its properties are compared to RE420MO (a polypropylene random copolymer of MFR 13 g/10 min and IE2 of WO2009/021686).

Results are presented in FIG. 1 and table 2. As can be seen in FIG. 1, the inventive example shows mono-crystalline behaviour (no transition to mesophase) with cooling rate up to 600 k/s.

The comparative example has a much lower cooling rate. Starting from 50 K/s, a new crystallisation peak appears at a much lower Tc which is the crystallisation of the mesophase. Crystallisation stops at the cooling rate of 200 k/s.

IE1 has much faster crystallisation rate measured as Tc with a broader cooling rate range.

TABLE 2

Polypropylene composition properties.

|  |  | CE | IE1 |
|---|---|---|---|
| MFR-final | g/10 min | 13 | 17.3 |
| Tensile modulus | MPa | 1124 | 1398 |
| Tensile strength | MPa | 29 | 33 |
| NIS-B | kJ/m2 | 6.2 | 5.8 |
| Haze-1 mm | % | 16 | 18.1 |
| SF | wt % | 8.02 | 8.2 |
| C2 | wt % | 3.03 | 2.5 |
| C2(SF) | wt % | 15.3 | 12.4 |
| C2(CF) | wt % | 2.5 | 1.7 |
| IV | dl/g | 1.7 | 1.6 |
| IV(SF) | dl/g | 0.5 | 0.6 |
| IV(CF) | dl/g | 1.8 | 1.7 |
| Top load force on cap | N | 1553 | 1741 |

Screw caps type PCO 1810 were made by injection moulding the polypropylene composition on an ENGEL Speed 180/45 injection moulding machine, equipped with a 12 cavity tool for screw caps.

The tool was supplied by Husky/KTW.

Injection moulding was done with an injection speed: 170 cm³/sec, a holding pressure. 860 bar and melt temperature of 230° C. or 240° C. and tool temperature of 12° C.
Cycle and cooling times are given in Table 3 to 5.

TABLE 3

Crystallisation temperatures at fast cooling rates

| Cooling rate [K/sec] | CE (RE420MO) | | IE |
|---|---|---|---|
| K/s | Tc. mono | Tc. meso | Tc. mono |
| 0.05 | 124 | | |
| 0.16 | 120 | | 127 |
| 0.5 | 116 | | |
| 1 | 102 | | 116 |
| 2 | 97 | | 113 |
| 3 | 94 | | 112 |
| 4 | 91 | | 110 |
| 5 | 90 | | 108 |
| 6 | 89 | | 108 |
| 7 | 88 | | 106 |
| 8 | 86 | | 106 |
| 9 | 85 | | 105 |
| 10 | 84 | | 104 |
| 20 | 81 | | 99 |
| 30 | 75 | | 96 |
| 40 | 72 | | 93 |
| 50 | 70 | 26 | 91 |
| 60 | 65 | 23 | 89 |
| 70 | 59 | 21 | 87 |
| 80 | 58 | 19 | 85 |
| 90 | 55 | 17 | 84 |
| 100 | 54 | 15 | 83 |
| 200 | 52 | 11 | 72 |
| 300 | | | 63 |
| 400 | | | 58 |
| 500 | | | 57 |
| 600 | | | 53 |

TABLE 4

Processing behaviour of the Inventive Example at various cycle times and mass temperatures

| | | Inventive example | |
|---|---|---|---|
| Cycle-time [sec] | Cooling time [sec.] | Mass Temperature 240° C. | Mass Temperature 230° C. |
| 5.1 | 2.5 | Good (minimal Angel Hair & high tips) | Good (minimal Angel Hair & high tips) |
| 4.9 | 2.3 | Good (High Tips) | Good (minimal Angel Hair & high tips) |
| 4.7 | 2.1 | sometimes demoulding problems | sometimes demoulding problems |
| 4.5 | 1.9 | Demoulding problems (ring tears off) | Demoulding problems |
| 4.3 | 1.7 | Not Possible | Demoulding problems (ring tears off) |

TABLE 5

Processing behaviour of the comparative Example at various cycle times and mass temperatures

| | | Comparative Example | |
|---|---|---|---|
| Cycle-time [sec] | Cooling time [sec.] | Mass Temperature 240° C. | Mass Temperature 230° C. |
| 5.1 | 2.5 | Good (minimal Angel Hair & high tips) | Good (minimal Angel Hair & high tips) |
| 4.9 | 2.3 | Demoulding problems | Good (minimal Angel Hair & high tips) |
| 4.7 | 2.1 | major demoulding problems (ring tears off) | Demoulding problems |
| 4.5 | 1.9 | Not Possible | major demoulding problems (ring tears off) |
| 4.3 | 1.7 | Not Possible | Not Possible |

The invention claimed is:

1. A process for producing a cap or closure comprising obtaining a polypropylene composition by sequential polymerization comprising the steps:
   A) polymerizing in a first reactor, in the presence of a Ziegler-Natta catalyst, monomers comprising propylene and optionally one or more comonomers selected from ethylene and C4-C10 alpha-olefins, to obtain a first propylene polymer fraction having a comonomer content in the range of 0.0 to 1.8 wt %, and a MFR2 in the range of from 12.0 to 40.0 g/10 min, as measured according to ISO 1133 at 230° C. under a load of 2.16 kg;
   B1) polymerizing in a second reactor, monomers comprising propylene and one or more comonomers selected from ethylene and C4-C10 alpha-olefins, in the presence of the first propylene polymer fraction, to obtain a second propylene polymer fraction,
      wherein the polypropylene composition comprising said first and second propylene polymer fractions and optionally a third propylene polymer fraction has an MFR2 in the range of from 12.0 to 60.0 g/10 min, as measured according to ISO 1133 at 230° C. under a load of 2.16 kg, has a comonomer content in the range of from 2.2 to 5.0 wt % and wherein the ratio of the comonomer content of the first propylene polymer fraction to the comonomer content of the polypropylene composition is 0.35 or less, C) melting, extruding and moulding the polypropylene composition in the presence of at least one nucleating agent to prepare a cap or closure; and D) exposing the cap or closure obtained in step (C) to a cooling rate of 50K/s or more.

2. The process as claimed in claim 1 further comprising, after step A and B1, and before step C) and D), (B2) polymerizing in a third reactor, monomers comprising propylene and one or more comonomers selected from ethylene and optionally C4-C10 alpha olefins, in the presence of the second propylene polymer fraction to obtain the third propylene polymer fraction.

3. The process of claim 1, wherein the polymerization is carried out in the presence of a Ziegler-Natta catalyst which is free of a phthalic compound.

4. The process of claim 1, wherein the one or more comonomers are selected from solely ethylene.

5. The process of claim 1, wherein the comonomer content of the polypropylene composition is in the range of 2.2 to 4.5 wt %.

6. The process of claim 1, wherein the at least one nucleating agent is present in the range of from 0.01 to 1.0 wt %, relative to the total amount of polypropylene composition.

7. The process of claim 1, wherein said polypropylene composition has
a crystallisation temperature (Tc) of at least 55° C. when subjected to a cooling rate of 100 K/s; and
a crystallisation temperature (Tc) of at least 40° C. when subjected to a cooling rate of 300 K/s.

8. The process of claim 1, wherein the cooling rate is 100 to 600 K/s.

9. The process of claim 1, wherein the melting step is effected at a temperature of at least 200° C.

10. The process of claim 1, wherein the moulding in step C) is effected in a mould and after cooling step D), the cap or closure is ejected from the mould and a new cap or closure is then formed in the mould and subjected to cooling step D).

11. The process of claim 10, wherein the cycle time for each cap to be moulded, cooled, and ejected from the mould is 6.0 secs or less.

12. The cap or closure obtained by the process of claim 1.

13. The process of claim 2, wherein the moulding in step C) is effected in a mould and after cooling step D), the cap or closure is ejected from the mould and a new cap or closure is then formed in the mould and subjected to cooling step D).

14. The process of claim 13, wherein the cycle time for each cap to be moulded, cooled, and ejected from the mould is 6.0 secs or less.

15. The cap or closure is obtained by the process of claim 2.

16. The process of claim 1, wherein the first reactor is a slurry reactor and/or the second reactor is a first gas-phase reactor.

17. The process of claim 2, wherein the first reactor is a slurry reactor and/or the second reactor is a first gas-phase reactor, and/or the third reactor is a third gas-phase reactor.

18. A cap or closure comprising a polypropylene composition and at least one nucleating agent, wherein said polypropylene composition having a first homo or copolymer fraction, a second copolymer fraction and optionally a third copolymer fraction, said polypropylene composition having an ethylene content of 2.2 to 5.0 wt % and wherein said polypropylene composition has
a crystallisation temperature (Tc) of at least 90° C. when subjected to a cooling rate of 10 K/s;
a crystallisation temperature (Tc) of at least 55° C. when subjected to a cooling rate of 100 K/s; and
a crystallisation temperature (Tc) of at least 40° C. when subjected to a cooling rate of 300 K/s.

19. The cap or closure of claim 18, wherein the polypropylene composition has an MFR2 in the range of from 12.0 to 60.0 g/10 min, as measured according to ISO 1133 at 230° C. under a load of 2.16 kg, and wherein the ratio of the comonomer content of the first homo or copolymer fraction to the comonomer content of the polypropylene composition is 0.35 or less.

20. The cap or closure as claimed in claim 18, wherein said polypropylene composition comprises the first homo or copolymer fraction, the second copolymer fraction and the third copolymer fraction.

21. A process for producing a cap or closure comprising obtaining a first polypropylene composition comprising a nucleating agent and a second polypropylene composition having a first homo or copolymer fraction, a second copolymer fraction and optionally a third copolymer fraction, wherein said second polypropylene composition having an ethylene content of 2.2 to 5.0 wt % and, wherein said second polypropylene composition has
a crystallisation temperature (Tc) of at least 90° C. when subjected to a cooling rate of 10 K/s;
a crystallisation temperature (Tc) of at least 55° C. when subjected to a cooling rate of 100 K/s; and
a crystallisation temperature (Tc) of at least 40° C. when subjected to a cooling rate of 300 K/s;
melting, extruding and moulding the second polypropylene composition in the presence of the at least one nucleating agent to prepare a cap or closure; and
exposing the cap or closure obtained to a cooling rate of 100K/s or more.

\* \* \* \* \*